United States Patent
Leppänen et al.

(10) Patent No.: US 10,235,812 B2
(45) Date of Patent: *Mar. 19, 2019

(54) AUGMENTED REALITY

(71) Applicant: Nokia Technologies Oy, Espoo (FI)

(72) Inventors: Jussi Artturi Leppänen, Tampere (FI);
Antti Johannes Eronen, Tampere (FI);
Arto Juhani Lehtiniemi, Lempäälä (FI)

(73) Assignee: Nokia Technologies Oy, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 15/680,229

(22) Filed: Aug. 18, 2017

(65) Prior Publication Data

US 2017/0352193 A1    Dec. 7, 2017

Related U.S. Application Data

(63) Continuation of application No. 14/666,395, filed on Mar. 24, 2015, now Pat. No. 9,767,614.

(51) Int. Cl.
   *G06T 19/00* (2011.01)
   *G06F 3/01* (2006.01)
   *G06T 7/20* (2017.01)

(52) U.S. Cl.
   CPC ............ *G06T 19/006* (2013.01); *G06F 3/011* (2013.01); *G06F 3/013* (2013.01); *G06T 7/20* (2013.01)

(58) Field of Classification Search
   CPC ......... G06T 19/006; G06F 3/011; G06F 3/013
   USPC .............................................. 345/633; 342/27
   See application file for complete search history.

(56) References Cited

U.S. PATENT DOCUMENTS

| 6,657,637 | B1 | 12/2003 | Inagaki et al. |
| 2009/0128618 | A1 | 5/2009 | Fahn et al. |
| 2009/0219406 | A1 | 9/2009 | Matsuyama |
| 2009/0289956 | A1 | 11/2009 | Douris et al. |
| 2013/0093788 | A1 | 4/2013 | Liu et al. |
| 2013/0162632 | A1 | 6/2013 | Varga et al. |
| 2013/0214961 | A1 | 8/2013 | Lee et al. |
| 2014/0078175 | A1 | 3/2014 | Forutanpour et al. |
| 2014/0118483 | A1 | 5/2014 | Rapoport et al. |
| 2014/0132484 | A1 | 5/2014 | Pandey et al. |
| 2014/0132629 | A1 | 5/2014 | Pandey et al. |
| 2014/0168056 | A1 | 6/2014 | Swaminathan et al. |

(Continued)

FOREIGN PATENT DOCUMENTS

| CN | 103262097 A | 8/2013 |
| WO | WO2012076062 A1 | 6/2012 |
| WO | WO2015017292 A1 | 2/2015 |

OTHER PUBLICATIONS

Wagner et al: Real-time detection and tracking for augmented reality on mobile phones. IEEE Transactions on Visualization and Computer Graphics, vol. 16, No. 3, May/Jun. 2010, pp. 355-368.

*Primary Examiner* — Ryan R Yang

(74) *Attorney, Agent, or Firm* — Seppo Laine Oy

(57) ABSTRACT

In accordance with an example aspect, there is provided an apparatus comprising at least one processing core and at least one memory including computer program code, the at least one memory and the computer program code being configured to, with the at least one processing core, cause the apparatus at least to obtain a movement context of a user, rank, based at least in part on the movement contest, at least two objects based on their visibility to the user, and determine, based at least in part on the ranking, at least one of the at least two objects as a placement object for an augmented reality information element.

21 Claims, 6 Drawing Sheets

(56) References Cited

U.S. PATENT DOCUMENTS

2015/0015611 A1  1/2015  Meier et al.
2016/0093105 A1  3/2016  Rimon et al.

AUGMENTED REALITY

FIELD OF INVENTION

The present invention relates to the field of information management for augmented reality systems and/or camera systems.

BACKGROUND OF INVENTION

Augmented reality is an arrangement wherein a direct or indirect view of a real, physical environment is supplemented, or augmented, with additional, or supplementary, information. The supplementary information may relate to objects in the view of the physical environment, such that the supplementary information may provide additional information that relates to the real, physical objects in the view of the physical environment.

An example of augmented reality is where a smartphone camera is used to capture a view of a landscape, for example of a city. The view may be provided to a screen comprised in the smartphone, as in a case where a user pans the smartphone with the intent to capture a digital photograph of the landscape using the camera. Software running on the smartphone may determine at least some of the contents of the view, for example based on an orientation and location of the smartphone that may both be determined using sensor data from sensors comprised in the smartphone.

Using the orientation and location of the smartphone, the software may interlay the view of the landscape with supplementary information relating to objects that are in the view. For example, where the software relates to operating a machine, the interlaid supplementary information may relate to how the user should interact with machine controls to use the machine.

Alternatively to a smartphone, glasses comprising a transparent display may be worn by a user such that the user is enabled to look through the glasses to see the outside world, and augmented reality software may overlay on the transparent display information concerning objects in the view the user can see.

In some cars, a windscreen is used, at least partly, to convey information to the user. In this case, information relating to operating the car may be reflected to the driver's eyes via the windscreen. Where the user can see the actual physical view through the display, the view is direct, whereas where the user sees the physical view on a non-transparent display, as in the smartphone case, the view may be seen as indirect.

SUMMARY OF THE INVENTION

The invention is defined by the features of the independent claims. Some specific embodiments are defined in the dependent claims.

In accordance with a first aspect of the present invention, there is provided an apparatus comprising at least one processing core and at least one memory including computer program code, the at least one memory and the computer program code being configured to, with the at least one processing core, cause the apparatus at least to obtain a movement context of a user, rank, based at least in part on the movement context, at least two objects based on their visibility to the user, and determine, based at least in part on the ranking, at least one of the at least two objects as a placement object for an augmented reality information element.

Various embodiments of the first aspect may comprise at least one feature from the following bulleted list:

- the at least one memory and the computer program code are configured to, with the at least one processing core, cause the apparatus to rank the at least two objects based, at least in part, on estimating, based at least in part on the movement context, a field of vision of the user and estimating how long each of the at least two objects is in the field of vision
- the at least one memory and the computer program code are configured to, with the at least one processing core, cause the apparatus to estimate the field of vision based at least in part on a navigation route comprised in the movement context
- the at least one memory and the computer program code are configured to, with the at least one processing core, cause the apparatus to estimate the field of vision based at least in part on a direction of movement comprised in the movement context of the user
- the at least one memory and the computer program code are configured to, with the at least one processing core, cause the apparatus to rank the at least two objects based, at least in part, on a movement context of at least one of the at least two objects
- the movement context of the user comprises information on where the user has been in the past
- the movement context further comprises information on where a gaze of the user has been directed in the past
- the at least one memory and the computer program code are configured to, with the at least one processing core, cause the apparatus to rank the at least two objects based at least in part on object type data structures
- the at least one memory and the computer program code are configured to, with the at least one processing core, cause the apparatus to select the augmented reality information element in dependence of an identity of the user
- the augmented reality information element comprises at least one of: a traffic bulletin, a personal message, an advertisement, a general public announcement and a status message relating to a device
- the at least one memory and the computer program code are configured to, with the at least one processing core, cause the apparatus to rank the at least two objects based at least in part on object noticeability values
- the at least one memory and the computer program code are configured to, with the at least one processing core, cause the apparatus to rank the at least two objects based at least in part on a three dimensional neighbourhood model to determine their visibility to the user.

In accordance with a second aspect of the present invention, there is provided an apparatus comprising at least one processing core and at least one memory including computer program code, the at least one memory and the computer program code being configured to, with the at least one processing core, cause the apparatus at least to identify an object of interest, predict at least one of a movement path, movement speed and a movement pace of the object of interest, and adjust at least one camera setting based on the movement path of the object of interest and on a movement context of a user.

Various embodiments of the second aspect may comprise at least one feature from the following bulleted list:

- the at least one memory and the computer program code are configured to, with the at least one processing core, cause the apparatus to trigger the camera responsive to a determination there is a clear shot of the object of interest the at least one memory and the computer program code are configured to, with the at least one processing core, cause the apparatus to adjust at least one of a focus camera setting and a shutter speed camera setting.

In accordance with a third aspect of the present invention, there is provided a method comprising obtaining a movement context of a user, ranking, based at least in part on the movement context, at least two objects based on their visibility to the user, and determining, based at least in part on the ranking, at least one of the at least two objects as a placement object for an augmented reality information element.

Various embodiments of the third aspect may comprise at least one feature corresponding to a feature from the preceding bulleted list laid out in connection with the first aspect.

In accordance with a fourth aspect of the present invention, there is provided a method, comprising identifying an object of interest, predicting at least one of a movement path, movement speed and a movement pace of the object of interest, and adjusting at least one camera setting based on the movement path of the object of interest and on a movement context of a user.

Various embodiments of the fourth aspect may comprise at least one feature corresponding to a feature from the preceding bulleted list laid out in connection with the second aspect.

In accordance with a fifth aspect of the present invention, there is provided an apparatus comprising means for obtaining a movement context of a user, means for ranking, based at least in part on the movement context, at least two objects based on their visibility to the user, and means for determining, based at least in part on the ranking, at least one of the at least two objects as a placement object for an augmented reality information element.

In accordance with a sixth aspect of the present invention, there is provided an apparatus, comprising means for identifying an object of interest, means for predicting at least one of a movement path, movement speed and a movement pace of the object of interest, and means for adjusting at least one camera setting based on the movement path of the object of interest and on a movement context of a user.

In accordance with a seventh aspect of the present invention, there is provided a non-transitory computer readable medium having stored thereon a set of computer readable instructions that, when executed by at least one processor, cause an apparatus to at least obtain a movement context of a user, rank, based at least in part on the movement context, at least two objects based on their visibility to the user, and determine, based at least in part on the ranking, at least one of the at least two objects as a placement object for an augmented reality information element.

In accordance with an eighth aspect of the present invention, there is provided a non-transitory computer readable medium having stored thereon a set of computer readable instructions that, when executed by at least one processor, cause an apparatus to at least identify an object of interest, predict at least one of a movement path, movement speed and a movement pace of the object of interest, and adjust at least one camera setting based on the movement path of the object of interest and on a movement context of a user.

In accordance with a ninth aspect of the present invention, there is provided a method, comprising identifying at least two objects in a user's field of view, predicting at least one movement path of at least one of the at least two objects, determining a speed of at least one of the at least two objects, determining a movement context of a user, estimating for each of the at least two objects a time it will remain in the user's field of view based at least in part on at least one of the movement path and speed of the object and on the movement context of the user, and selecting from among the at least two objects a first object estimated to stay longest in the user's field of view.

Various embodiments of the ninth aspect may comprise at least one feature from the following bulleted list:

the method further comprises adjusting at least one camera setting based at least in part on the movement path of the first object the method further comprises using the first object as a placement object for an augmented reality information element the method further comprises selecting an augmented reality information element to place on the first object in dependence of the time the first object will remain in the user's field of view.

In accordance with a tenth aspect of the present invention, there is provided an apparatus comprising at least one processing core and at least one memory including computer program code, the at least one memory and the computer program code being configured to, with the at least one processing core, cause the apparatus at least to identify at least two objects in a user's field of view, predict at least one movement path of at least one of the at least two objects, determine a speed of at least one of the at least two objects, determine a movement context of a user, estimating for each of the at least two objects a time it will remain in the user's field of view based at least in part on at least one of the movement path and speed of the object and on the movement context of the user and select from among the at least two objects a first object estimated to stay longest in the user's field of view.

Various embodiments of the tenth aspect may comprise at least one feature corresponding to a feature from the preceding bulleted list laid out in connection with the ninth aspect.

In accordance with an eleventh aspect of the present invention, there is provided a computer program configured to cause a method in accordance with at least one of the third, fourth or ninth aspects to be performed.

INDUSTRIAL APPLICABILITY

At least some embodiments of the present invention find industrial application in facilitating communication using augmented reality principles.

DETAILED DESCRIPTION OF EXAMPLE EMBODIMENTS

By ranking objects based on their visibility and/or prominence to a user, effectiveness of messages displayed in augmented reality can be improved. In this case, the messages may relate to the user or surroundings of the user, for example. In other words, unlike in traditional augmented reality applications the supplementary information need not relate directly to the real-life object to which the supplementary information is visually associated in an augmented view.

Figure 1:
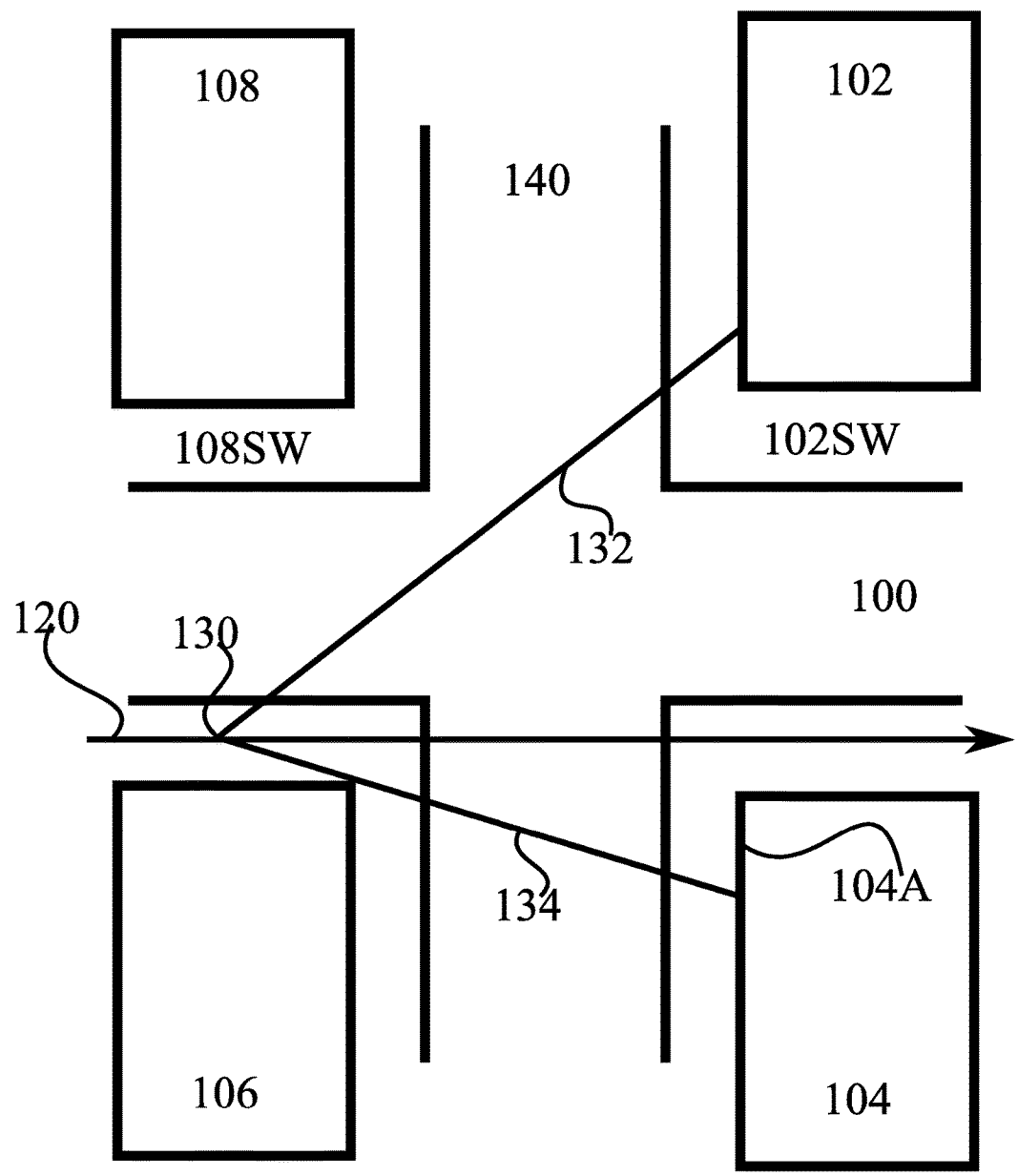
FIG. 1 illustrates an example system capable of supporting at least some embodiments of the present invention.

FIG. 1 illustrates an example system capable of supporting at least some embodiments of the present invention. FIG. 1 has a map illustrating an intersection of streets 100 and 140. The intersection is four-way in the sense that both streets continue past the intersection, meaning that the intersection may be departed from into four different directions. At the four corners of the intersection are, in clockwise order, building 102, building 104, building 106 and building 108. Sidewalks 102SW and 108SW are disposed between the streets and buildings 102 and 108, respectively. Sidewalks are also disposed between buildings 104 and 106 and the streets, but these are not numbered in FIG. 1 for the sake of clarity.

A user may move around in the city where the intersection is located in. In the example of FIG. 1, a route taken by the user is illustrated with arrow 120. As arrow 120 shows, the user walks on the sidewalk along street 100 from the left toward the right, crossing street 140 at the intersection. There may be a pedestrian crossing to enable the user to make this crossing, for example, such pedestrian crossing being optionally equipped with traffic lights configured to regulate the flow of traffic.

The user in this example uses an augmented reality system, for example an augmented reality system based on eyeglasses that comprise a display mechanism. An augmented reality system may comprise a display mechanism and an augmented reality application running on at least one processing core. The augmented reality application may run locally on a user device, or it may run, at least in part, remotely on a server or in a cloud computing environment. Such an augmented reality system may allow light to proceed from objects in the user's surroundings to the user's eyes, and also allow the display mechanism to provide supplementary visual information to the user. The supplementary information may be provided in a way that associates the supplementary information with objects comprised in the view. For example, the display mechanism may comprise a miniature projector arranged to reflect light from the inner surface of the eyeglasses to the user's eye or eyes such that to the user, the reflected light can convey the supplementary information spatially associated with an object in the real-life view. Thus the view experienced by the user may comprise both light originating from real objects in the user's surroundings as well as light provided by the display mechanism. The supplementary visual information may, for example, highlight features in the user's surroundings, such as metro stations and/or ticket vending machines. Although described as a direct view example, embodiments of the present invention are equally applicable to augmented reality applications that rely on indirect view.

Buildings 102, 104, 106 and 108 may be seen as objects in the physical surroundings of the user. Also parts, or segments, of the buildings may be seen as objects. Further examples of objects include cars and advertisement stands. Augmented reality applications may be configured to provide information elements placed visually on objects. By this it is meant that the information elements are rendered by the display mechanism such that to the user, the information elements seem to be attached to or associated with the objects, for example analogously to how a poster may be attached to a wall or stand. When information elements are placed visually on objects, the information they contain may be presented to a user in a way that feels more natural and less distracting to the user, since people are used to seeing information on objects, rather than information that seems to simply float in the air, disassociated from any real life object. An object onto which an information element is visually placed may be referred to as a placement object.

The augmented reality application may be configured to determine at least one placement object to present an information element to the user. Instead of presenting to the user information concerning the placement object, the augmented reality application may be configured to present to the user information that is targeted to the user. To facilitate this, the augmented reality application may be configured to select a placement object for the information in a way that maximizes the visibility of the information element to the user. The information element to be presented to the user may also be selected, for example from a set of information elements, for example based on at least one of urgency, complexity and a characteristic of a placement object. For example, responsive to a determination that a placement object will be visible to the user for a longer time, an information element comprising a longer message to the user may be selected, and responsive to a determination that a placement object will be visible to the user for a shorter time, an information element comprising a shorter message may be selected.

Information elements may be targeted to the user as part of a group or they may be targeted to the person of the user, for example. Examples of information elements targeted to the user comprise traffic bulletins, personal messages, targeted advertisements, general public announcements and status messages relating to a device. An information element may be targeted to the user also via the user's location, for example an information element, such as a public safety bulletin, may be targeted to all persons in a given geographic location. An example of such a bulletin is a tsunami warning.

To maximize visibility, or prominence, of the information element when placed on an object, the placement object may be selected in dependence of a movement context of the user. A movement context may comprise a movement state. In general, a movement context may comprise a data structure that comprises at least one of the following: a location of the user, a direction in which the user is moving, a speed at which the user is moving, a navigation route the user is following, where the user has been in the past, and objects the user's gaze has been directed to in the past. A direction of the user's gaze may be obtained by the augmented reality application via a gaze tracking functionality, which may be comprised in an augmented reality device the user uses and with which the augmented reality application is associated.

A navigation route the user is following may comprise a navigation route that is active in a navigation application of the user. For example, the user may have a smartphone or other device that runs the navigation application, and the device that runs the augmented reality application may be the same device, or another device of the user, which is associated with the device running the navigation application. Such an association may take place via a subscription, such as a Google, Here or digital ecosystem account, for example. Alternatively, the navigation route may comprise a route of a public transport vehicle the user has boarded, for example.

A location of the user may be expressed in the movement context as an address, a geolocation or by using another suitable expression. A direction of movement may be expressed as a directional vector, which may also comprise an amplitude reflective of the speed at which the user is moving. Alternatively, the directional vector may be normalized and the speed may be indicated, if at all, using a separate number. In case the user uses a navigation application, the augmented reality application may obtain from the navigation application information disclosing whether the user is in a pedestrian or vehicular section of the navigation route. This information may be used by the augmented reality application to predict a speed of the user.

When the augmented reality application knows the movement context of a user, it may be enabled to predict where the user is likely to gaze. For example, in the example of FIG. 1, a likely field of vision of the user at point 130 is schematically illustrated by ray 132 and ray 134. Ray 134 is limited by a corner of building 106, while ray 132 is limited by the width of the field of view. The user will not see everything within the field defined by rays 132 and 134, but the user is likely to see at least something in this field, especially objects that are disposed near the centre of the field of view for a longer time. In FIG. 1, the augmented reality application may select a corner of building 104 denoted by 104A as a placement object for an information element to display to the user in the augmented reality view, since corner 104A is in the field of view, will remain there for a while longer as the user traverses route 120, and moreover it is near the centre of the field of view. As a further trigger to use corner 104A, the augmented reality view may assess that a traffic light may stop the user for a while before he can cross street 140, such that he will be facing corner 104 while he waits for the traffic light to turn green.

In general, objects, for example real-life objects, may be ranked based on their predicted visibility, and at least one placement object may be selected based at least in part on the ranking. The selected placement object may then be used to display an augmented reality information object, such as for example an information object as described above. The ranking may be based on assigning a visibility score to at least two objects, for example. A visibility score of an object may be defined in any of a number of possible ways, for example a visibility score may be a sum of a visibility time score and a visibility centrality score, wherein the visibility time score indicates a length of time the object is predicted to be in the user's field of vision and the visibility centrality score may indicate how close to the centre of the field of vision the object is predicted to be. In some embodiments, an information element is chosen for placement on a placement object at least in part in dependence of how long the placement object is predicted to remain in the field of view of the user. In detail, an information element with more information may be placed visually on a placement object that is predicted to remain longer in the user's field of view, to give the user time to digest the information. An information element that has less information, such as for example a shorter message, may be placed visually on an object that is predicted to remain in the field of view for a shorter time. This is so since the user can grasp the information content of such an information element faster, so a placement object that remains in view for a shorter time is acceptable.

In some embodiments, the visibility score is an integral over time of the predicted visibility centrality score. An integral of this sort may provide the advantage that it may effectively capture the amount of attention the user is likely to assign to the object.

Alternatively or additionally to predicting visibility of objects based on current movement of the user, the augmented reality application may rank at least two objects based on where the user has been in the past. For example, a wall of the user's office may be ranked as having high visibility, and therefore may be selected as a placement object, due to the fact that the user spends a lot of time in his office. Gaze tracking may be used to rank objects in places where the user spends a lot of time, to enable selecting as placement objects the objects the user specifically has a habit of looking at. To enable this kind of ranking, the augmented reality application may compile historical gaze tracking information. Historical movement, location and/or gaze tracking information may be comprised in the movement context. In some embodiments, the movement context only comprises historical movement, location and/or gaze tracking information. By historical it is meant something that has already occurred, it is not meant to imply that a great length of time has elapsed since.

In some embodiments, the augmented reality application may be configured to perform the ranking based at least in part on object types. Objects may be associated, in the augmented reality application, with object type data structures that comprise information characterizing the real-life objects. For example, a car manufacturer may prefer to convey information elements to users via cars of its own make. In such a case, at least some cars would be associated in the augmented reality application with object type data structures that comprise a manufacturer data entry, and the augmented reality information element provided by the manufacturer may be furnished with a requirement that it may be conveyed to the user only on a placement object that is indicated in the associated object type data structure as being manufactured by the same manufacturer. Thus a user may be reminded of a due maintenance of his car by an augmented reality information element that is placed visually on a car of the same make. As another example, some real-life objects may have associated object types in the augmented reality application that indicate the objects may not be occluded by augmented reality information elements. For example, where the real-life objects are used to convey safety-relevant real-life information placing augmented reality information elements visually on them may endanger safety of the user and/or other persons. Examples of such objects include traffic lights and medical devices in hospitals. As users tend to often look at traffic lights, for example, the traffic lights might otherwise rank highly as frequently gazed-at objects and seem like promising placement objects for augmented reality information elements. To enable use of object type data structures, the augmented reality application may be configured to associate real-life objects with the object type data structures. Such an association may be facilitated by user location and/or some form of image recognition software, for example.

In some embodiments, the augmented reality application may be configured to perform the ranking based at least in part on object noticeability values. An object may be associated with a noticeability value, which may be received in the augmented reality application from an external source, and/or the augmented reality application may be configured to determine at least one noticeability value. For example, where an object is the sole representative of its object type, its noticeability value may be higher. An example of this is where there is only one car on a street where a large number of pedestrian and bicyclists are present. The car, being the only representative of object type car, may be assigned a higher noticeability value.

Object types may, in some embodiments, be classified based on how often the user directs his gaze at them. Thus the augmented reality application may become enabled to select objects as placement objects based on object types the user is interested in. For example, if the augmented reality application realizes the user frequently directs his gaze at guitars or sports utility vehicles, SUVs, these object types may be selected as placement objects in the future. To prevent irritation to the user, in this case the augmented reality information elements may be placed visually next to these objects, rather than visually on these objects, so as to not annoy the user by occluding real-life objects he is interested in seeing.

In some embodiments, a placement of an information element may be adjusted in real time responsive to a determination, by the augmented reality application, that the user is viewing something near the information element but is not looking quite at the information element. In this case, the information element may be moved so it is visually closer to where the user has directed his gaze.

In some embodiments, information on object shape may be taken into account when ranking objects based on their visibility. Such information may describe three-dimensional shapes of the objects. For example, shapes of buildings may be used to determine whether they occlude objects that lie behind them. For example, the number of storeys in a building may affect the view-blocking characteristics of the building.

In some embodiments, an augmented reality application may be used to aid in the photography of objects appearing for only a short time in the user's field of view. Such objects might be missed because of the time it takes to focus and adjust the other settings for the camera. For example, a car may be determined to be an object that quickly moves past the user. If the user would like to take a picture of the car, the camera would need to first find the correct focus distance and other settings and then take the photo. This might lead to the user missing the photo opportunity. The augmented reality application may have an estimate of the trajectory of the car and/or the user, and it may be able to pre-adjust the focus distance of the camera to be the distance between the user's and car's trajectories. Taking a photo is thus faster. In the case of multiple objects around the user, the system may pre-adjust the focus, or other camera setting, based on the object that is the least amount of time in the user's field-of-view. Objects may be identified as potentially interesting to the user based on past gaze tracking information, for example. The camera may be comprised in a device associated with a device that runs the augmented reality application, for example, or the augmented reality application may run on the same device that also comprises the camera. In some embodiments, the augmented reality application may further be configured to cause the camera to be triggered at a correct time when the object of interest is visible, for example not occluded by passing cars.

Figure 2:
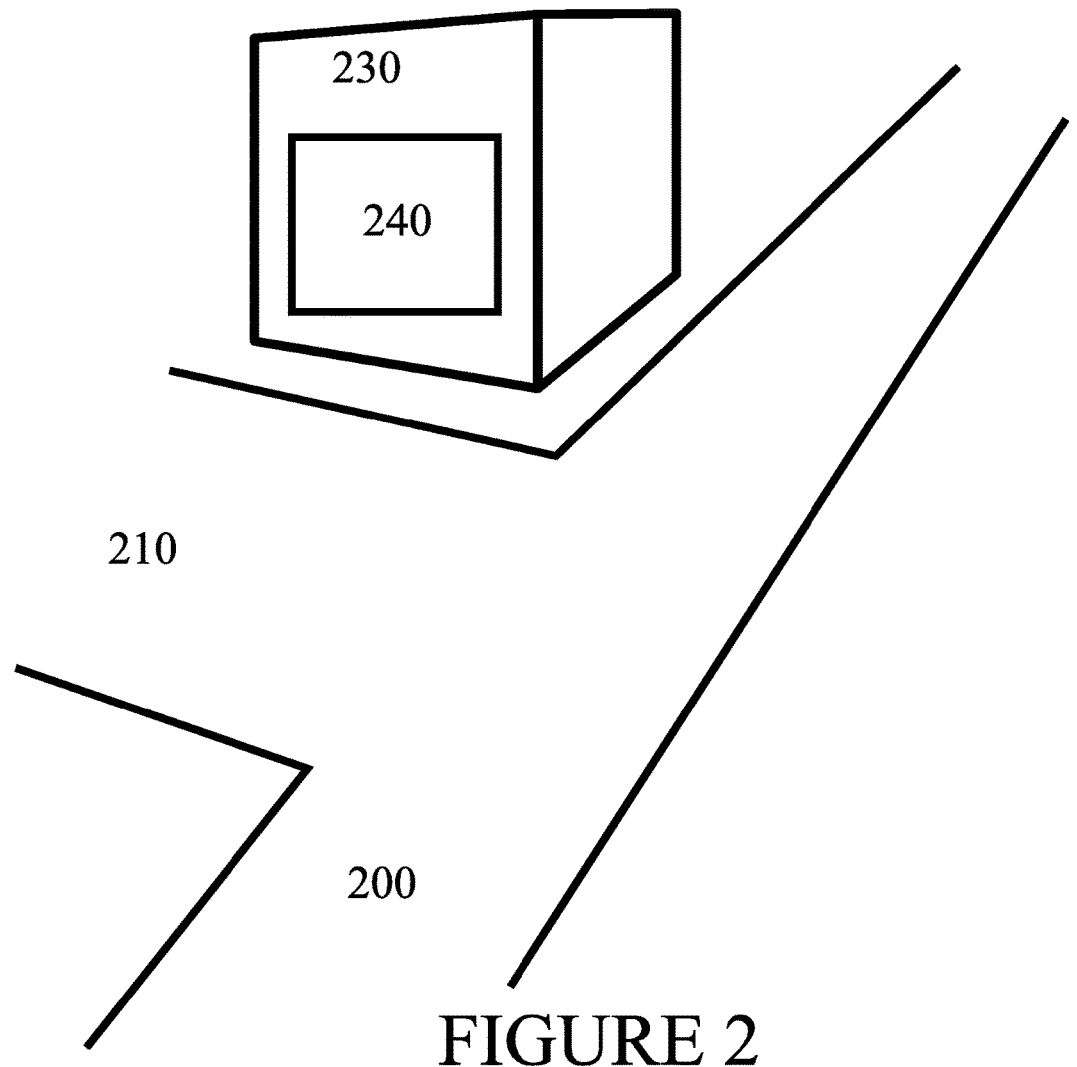
FIG. 2 illustrates an example use case in accordance with at least some embodiments of the present invention.

FIG. 2 illustrates an example use case in accordance with at least some embodiments of the present invention. FIG. 2 illustrates an augmented reality view, wherein streets 200 and 210, as well as building 230 are real-life objects, that is, they exist independently of the functioning of the augmented reality application. Augmented reality information element 240 is placed visually on building 230, in other words, for information element 240 building 230 is the placement object. Building 230 may be ranked based on its visibility prior to its selection as the placement object.

Figure 3:
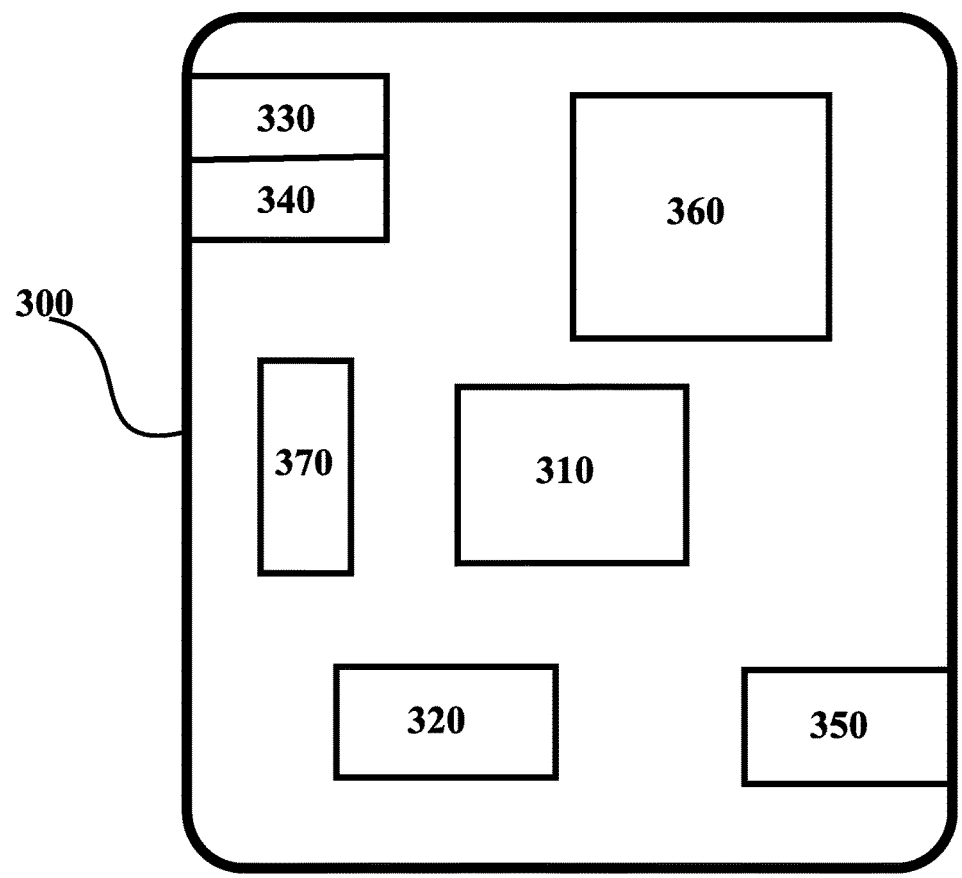
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device configured to run an augmented reality application. Thus device 300 may comprise, for example, a smartphone, a computing unit of a set of augmented reality glasses or another kind of suitable device. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone.

A user may be able to operate device 300 via UI 360, for example to configure augmented reality settings.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
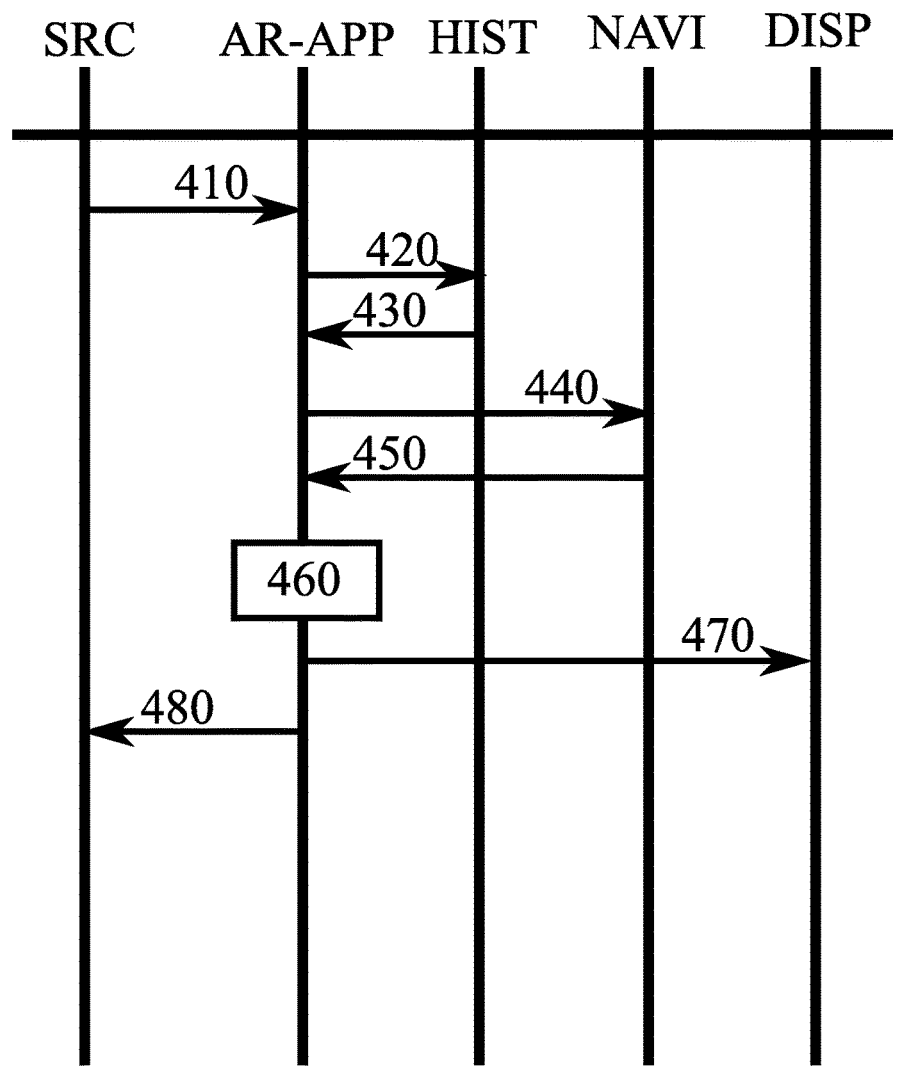
FIG. 4 illustrates signalling in accordance with at least some embodiments of the present invention.

FIG. 4 illustrates signalling in accordance with at least some embodiments of the present invention. On the vertical axes are disposed, from left to right, a source of augmented reality information elements SRC, an augmented reality application AR-APP, a historical database HIST, a navigation application NAVI, and a display mechanism DISP. Some embodiments of the invention may lack historical database HIST and/or navigation application NAVI. The source may comprise, for example, a public safety authority, an advertiser or a computing device of the user, for example.

In phase 410, the source SRC provides to the augmented reality application AR-APP an information element to display to the user. Optionally, the source may specify a criterion relating to object types in the communication of phase 410. In detail, the criterion may limit the types of objects the information element may be placed on. The augmented reality application may then consult at least one of the historical database HIST and the navigation application NAVI. Where the historical database is consulted, phases 420 and 430 are performed. Where the navigation application is consulted, phases 440 and 450 are performed.

In phase 420, the application requests from the historical database information concerning objects the user has looked at and/or been near in the past. In phase 430 the information requested in phase 420 is responsively provided to the augmented reality application. The requested information may form part of a movement context.

In phase 440, the application requests from the navigation application information concerning a route the user is moving along. In phase 450 the information requested in phase 440 is responsively provided to the augmented reality application. The requested information may form part of a movement context.

In phase 460, the augmented reality application ranks at least two objects, at least in part based on their visibility to the user. The objects may comprise real-life objects as described above. The ranking of phase 460 may take into account at least one of the optional criterion received in phase 410, a location of the user, a movement state of the user, any information received in phase 430 where that phase was present, and any information received in phase 450 where that phase was present. The ranking may proceed, for example, as described above in connection with FIG. 1. Based on the ranking a placement object is chosen from among the at least two objects as the placement object. In phase 470, the display mechanism is directed, by the augmented reality application, to place the information element visually on the placement object. In optional phase 480, the source may be informed the placement has been performed. Where gaze tracking is present, the source may be informed, in phase 480, also concerning whether the user gazed at the information element, and if so, optionally, for how long.

Figure 5:
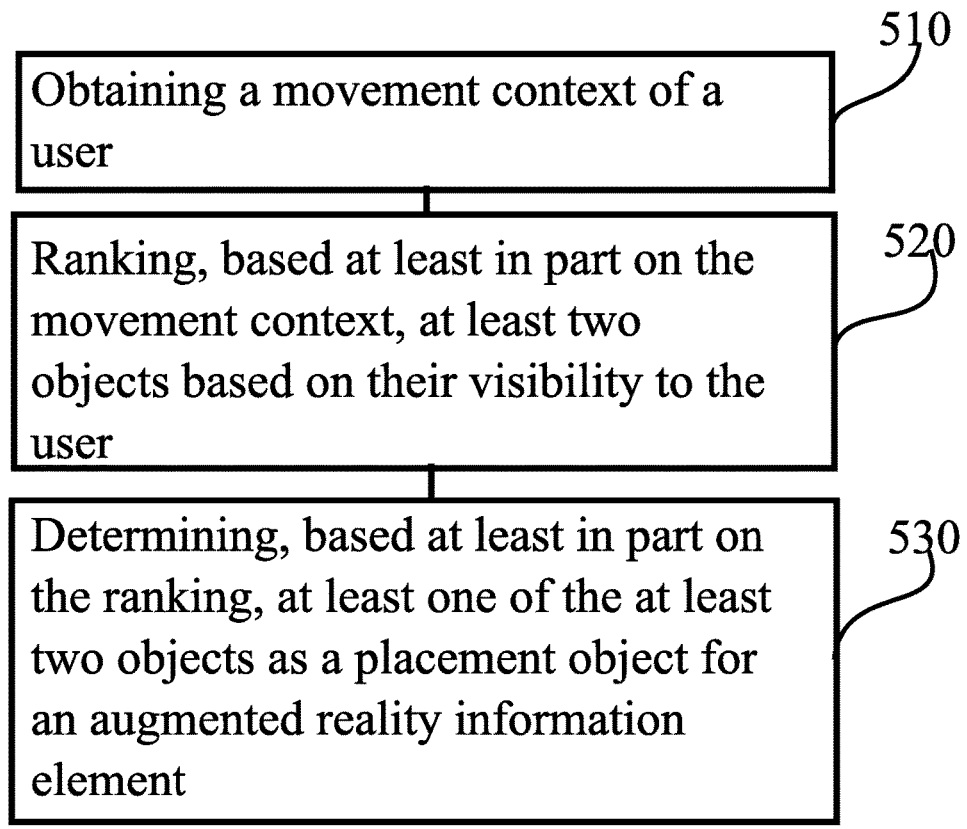
FIG. 5 is a first flow chart of a first method in accordance with at least some embodiments of the present invention.

FIG. 5 is a first flow chart of a first method in accordance with at least some embodiments of the present invention. The phases of the illustrated method may be performed in a device running an augmented reality application, for example. An example of such a device is illustrated in FIG. 3.

Phase 510 comprises obtaining a movement context of a user. Phase 520 comprises ranking, based at least in part on the movement contest, at least two objects based on their visibility to the user. Finally, phase 530 comprises determining, based at least in part on the ranking, at least one of the at least two objects as a placement object for an augmented reality information element.

Figure 6:
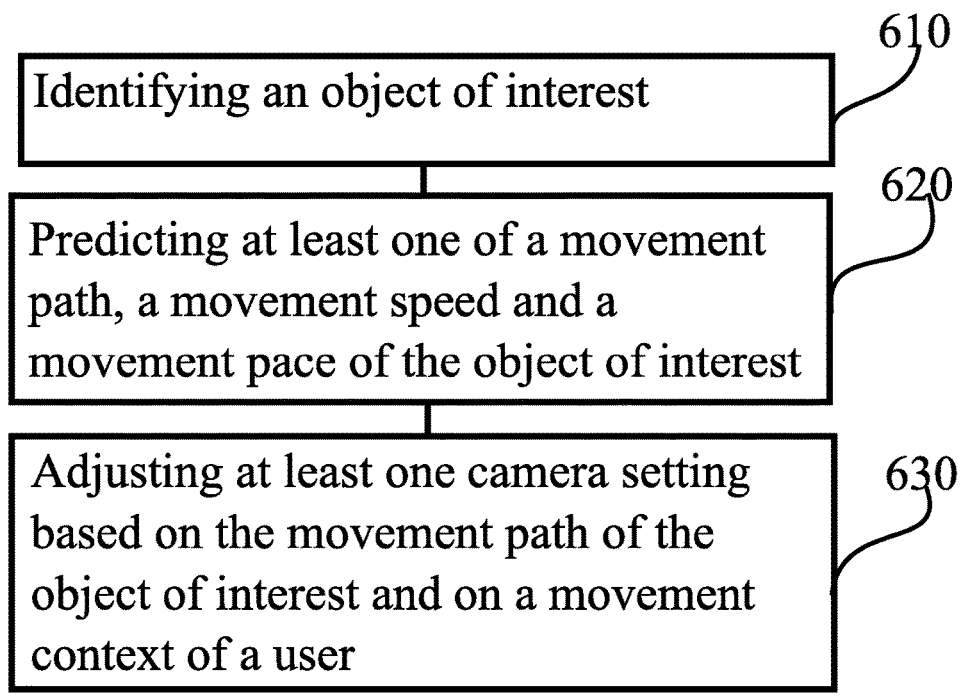
FIG. 6 is a second flow chart of a second method in accordance with at least some embodiments of the present invention.

FIG. 6 is a second flow chart of a second method in accordance with at least some embodiments of the present invention. The phases of the illustrated method may be performed in a smartphone, or a control device configured to control the functioning of a smartphone, for example.

Phase 610 comprises identifying an object of interest. Phase 620 comprises predicting at least one of a movement path, a movement speed and a movement pace of the object of interest. Finally, phase 630 comprises adjusting at least one camera setting based on the movement path of the object of interest and on a movement context of a user.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, described features, structures, or characteristics may be combined in any suitable or technically feasible manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising at least one processing core and at least one memory including computer program code, the at least one memory and the computer program code being configured to, with the at least one processing core, cause the apparatus at least to:
   obtain a movement context of a user comprising a navigation route of the user;
   rank, based at least in part on the movement context, at least two objects based on their visibility to the user, and
   determine, based at least in part on the ranking, at least one of the at least two objects as a placement object for an augmented reality information element; and provide the augmented reality information element placed visually on the placement object in an augmented reality view.

2. The apparatus according to claim 1, wherein the obtaining the movement context comprises obtaining a location, where the user is.

3. The apparatus according to claim 1, wherein the at least one memory and the computer program code are configured to, with the at least one processing core, cause the apparatus to determine a user gaze at the augmented reality information element.

4. The apparatus according to claim 3, wherein the at least one memory and the computer program code are configured to, with the at least one processing core, cause the apparatus to determine to inform a source of the augmented reality information element that the user gazed the augmented reality information element.

5. The apparatus according to claim 3, wherein the at least one memory and the computer program code are configured to, with the at least one processing core, cause the apparatus determine a length of the user gaze at the augmented reality information element.

6. The apparatus according to claim 4, wherein the source of the augmented reality information element comprises a public safety authority or an apparatus of the user.

7. The apparatus according to claim 1, wherein the navigation route of the user is a navigation route that is active in a navigation application.

8. A method comprising:
   obtaining a movement context of a user comprising a navigation route of the user;
   ranking, based at least in part on the movement context, at least two objects based on their visibility to the user, and
   determining, based at least in part on the ranking, at least one of the at least two objects as a placement object for an augmented reality information element and providing the augmented reality information element placed visually on the placement object in an augmented reality view.

9. The method according to claim 8, wherein the obtaining the movement context comprises obtaining a location, where the user is.

10. The method according to claim 8, comprising: determining a user gaze at the augmented reality information element.

11. The method according to claim 10, comprising: determining to inform a source of the augmented reality information element that the user has gazed the augmented reality information element.

12. The method according to claim 10, comprising: determining a length of the user gaze at the augmented reality information element.

13. The method according to claim 11, wherein the source of the augmented reality information element comprises a public safety authority or an apparatus of the user.

14. A non-transitory computer readable medium having stored thereon a set of computer readable instructions that, when executed by at least one processor, cause an apparatus to at least:
   obtain a movement context of a user comprising a navigation route of the user;
   rank, based at least in part on the movement context, at least two objects based on their visibility to the user, and
   determine, based at least in part on the ranking, at least one of the at least two objects as a placement object for an augmented reality information element;

and provide the augmented reality information element placed visually on the placement object in an augmented reality view.

15. A method, comprising:
identifying at least two objects in a user's field of view;
predicting at least one movement path of at least one of the at least two objects;
determining a movement context of a user;
estimating for each of the at least two objects a time it will remain in the user's field of view based on the movement path and the movement context of the user; and
selecting from among the at least two objects a first object estimated to stay longest in the user's field of view;
determining the first object as a placement object for an augmented reality information element; and
providing the augmented reality information element placed visually on the placement object in an augmented reality view.

16. The method according to claim 15, comprising: the determining the movement context comprises obtaining the location, where the user is.

17. The method according to claim 15, comprising: determining a user gaze at the augmented reality information element.

18. The method according to claim 17, comprising: determining to inform a source of the augmented reality information element that the user has gazed the augmented reality information element.

19. The method according to claim 17, comprising: determining a length of the user gaze at the augmented reality information element.

20. The method according to claim 18, wherein the source of the augmented reality information element comprises a public safety authority or an apparatus of the user.

21. An apparatus comprising at least one processing core and at least one memory including computer program code, the at least one memory and the computer program code being configured to, with the at least one processing core, cause the apparatus at least to:
identify at least two objects in a user's field of view;
predict at least one movement path of at least one of the at least two objects;
determine a movement context of a user;
estimate for each of the at least two objects a time it will remain in the user's field of view based on the movement path and the movement context of the user;
select from among the at least two objects a first object estimated to stay longest in the user's field of view;
determine the first object as a placement object for an augmented reality information element, and
provide the augmented reality information element placed visually on the placement object in an augmented reality view.

* * * * *